(12) United States Patent
Kojima et al.

(10) Patent No.: US 11,516,375 B2
(45) Date of Patent: Nov. 29, 2022

(54) DISPLAY DEVICE

(71) Applicant: Japan Display Inc., Tokyo (JP)

(72) Inventors: Tetsuya Kojima, Tokyo (JP); Mitsutaka Okita, Tokyo (JP); Daiichi Suzuki, Tokyo (JP); Emi Higano, Tokyo (JP); Shigesumi Araki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/447,716

(22) Filed: Sep. 15, 2021

(65) Prior Publication Data
US 2021/0409584 A1 Dec. 30, 2021

Related U.S. Application Data

(63) Continuation of application No. PCT/JP2020/000703, filed on Jan. 10, 2020.

(30) Foreign Application Priority Data

Mar. 27, 2019 (JP) ............... JP2019-060245

(51) Int. Cl.
*H04N 5/225* (2006.01)
*G02F 1/1343* (2006.01)
*F21V 8/00* (2006.01)
*G02F 1/1335* (2006.01)

(52) U.S. Cl.
CPC ..... *H04N 5/2257* (2013.01); *G02F 1/134363* (2013.01); *G02B 6/0075* (2013.01); *G02B 6/0088* (2013.01); *G02F 1/133514* (2013.01)

(58) Field of Classification Search
CPC ............ H04N 5/2257; G02F 1/134363; G02F 1/133514; G02B 6/0075; G02B 6/0088
USPC .............................................................. 349/2
See application file for complete search history.

(56) References Cited

U.S. PATENT DOCUMENTS

| 2019/0373166 | A1* | 12/2019 | Jia ........................ G09G 3/2003 |
| 2020/0098308 | A1* | 3/2020 | Li ............................. G09G 3/36 |
| 2020/0111401 | A1* | 4/2020 | Zhao .................... G09G 3/2003 |
| 2021/0311366 | A1* | 10/2021 | Tsunashima ...... G02F 1/136286 |

FOREIGN PATENT DOCUMENTS

JP 2007-163816 A 6/2007

OTHER PUBLICATIONS

International Search Report dated Mar. 17, 2020 in PCT/JP2020/000703 filed on filed Jan. 10, 2020, 2 pages.

* cited by examiner

*Primary Examiner* — Charles S Chang
(74) *Attorney, Agent, or Firm* — Maier & Maier, PLLC

(57) ABSTRACT

The display device includes a liquid crystal panel having pixels, and an imaging device arranged on a backside of the liquid crystal display panel, wherein in an imaging area of the liquid crystal display panel overlapping the imaging device, the pixels are controlled so that black display pixels and white display pixels are alternately lined up in a row direction according to an operation of the imaging device.

4 Claims, 12 Drawing Sheets

(A)

(B)

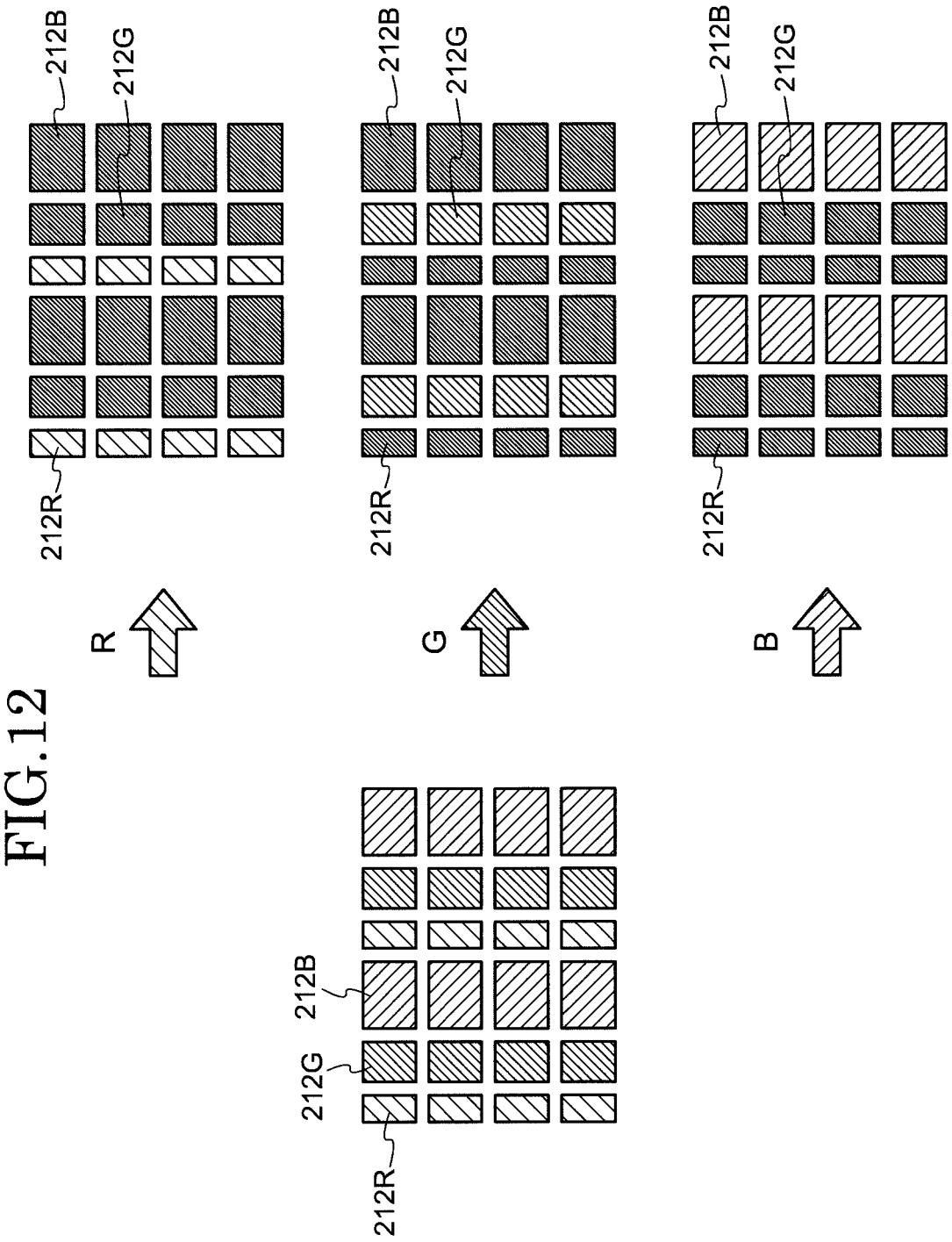

DISPLAY DEVICE

CROSS REFERENCE TO RELATED APPLICATIONS

This application is a Continuation of International Patent Application No. PCT/ JP2020/000703, filed on Jan. 10, 2020, which claims priority to Japanese Patent Application No. 2019-060245, filed on Mar. 27, 2019, the disclosures of which are incorporated herein by reference for all purposes as if fully set forth herein.

FIELD

One embodiment of the present invention relates to a display device having an imaging device.

BACKGROUND

In recent years, most personal digital assistants such as smartphones have an imaging device for taking pictures or moving images. Usually, the imaging device includes an imaging device called an out-camera provided on the backside (opposite a display screen) and an imaging device called an in-camera provided on the display screen side. The out-camera is used when taking landscape photography or a third party. On the other hand, the in-camera is used when taking the user self. Since the imaging device for the in-camera is arranged on the display screen side, it is usually arranged at a position avoiding a display area. Therefore, the area provided with the imaging device for the in-camera could not be used as the display area, and the imaging device for the in-camera has been an obstacle to enlarging the display screen.

On the other hand, an attempt has been made to arrange the camera on the backside of the display device and image the subject located on the display screen side. For example, Japanese laid-open patent publication No. 2007-163816 discloses a display device in which a camera unit is arranged on the backside of a transmissive liquid crystal panel. The display device described in the above prior art usually displays an image on the area in front of the camera unit, and at the time of photographing, performs an imaging process by displaying black on the area in front of the camera unit. Thus, the display device described in the above prior art can image a subject located on the display screen side using the camera unit arranged on the backside of the display device.

SUMMARY

A display device according to an embodiment of the present invention includes a liquid crystal display panel having pixels; and an imaging device arranged on a back side of the liquid crystal display panel. In an imaging area of the liquid crystal display panel overlapping the imaging device, the pixels are controlled so that black display pixels and white display pixels are alternately lined up in a row direction according to an operation of the imaging device.

A display device according to an embodiment of the present invention includes a liquid crystal display panel having pixels; and an imaging device arranged on a back side of the liquid crystal display panel. A main pixel of the liquid crystal display panel includes sub-pixels corresponding to different colors from each other. In an imaging area of the liquid crystal display panel overlapping the imaging device, one of the sub-pixels corresponds to white color. In an area other than the imaging area of the liquid crystal display panel, none of the sub-pixels corresponds to white color.

A display device according to an embodiment of the present invention includes a liquid crystal display panel having pixels; and an imaging device arranged on a back side of the liquid crystal display panel. A main pixel of the liquid crystal display panel contains sub-pixels corresponding to different colors from each other. In an imaging area of the liquid crystal display panel overlapping the imaging device, sub-pixels of the same color adjacent to each other in a row direction include pixel electrodes of different design patterns.

A display device according to an embodiment of the present invention includes a liquid crystal display panel having pixels; and an imaging device arranged on a back side of the liquid crystal display panel. A main pixel of the liquid crystal display panel includes sub-pixels corresponding to different colors from each other. The liquid crystal display panel includes an imaging area overlapping the imaging device and an area other than the imaging area. A space between line electrodes of a pixel electrode in each of the sub-pixels located in the imaging area is wider than a space between line electrodes of a pixel electrode in each of the sub-pixels located in the area other than the imaging area.

BRIEF DESCRIPTION OF THE DRAWINGS

FIG. 12 is a plan view of a configuration of a pixel electrode according to the fourth embodiment.

DESCRIPTION OF EMBODIMENTS

Figure 1:
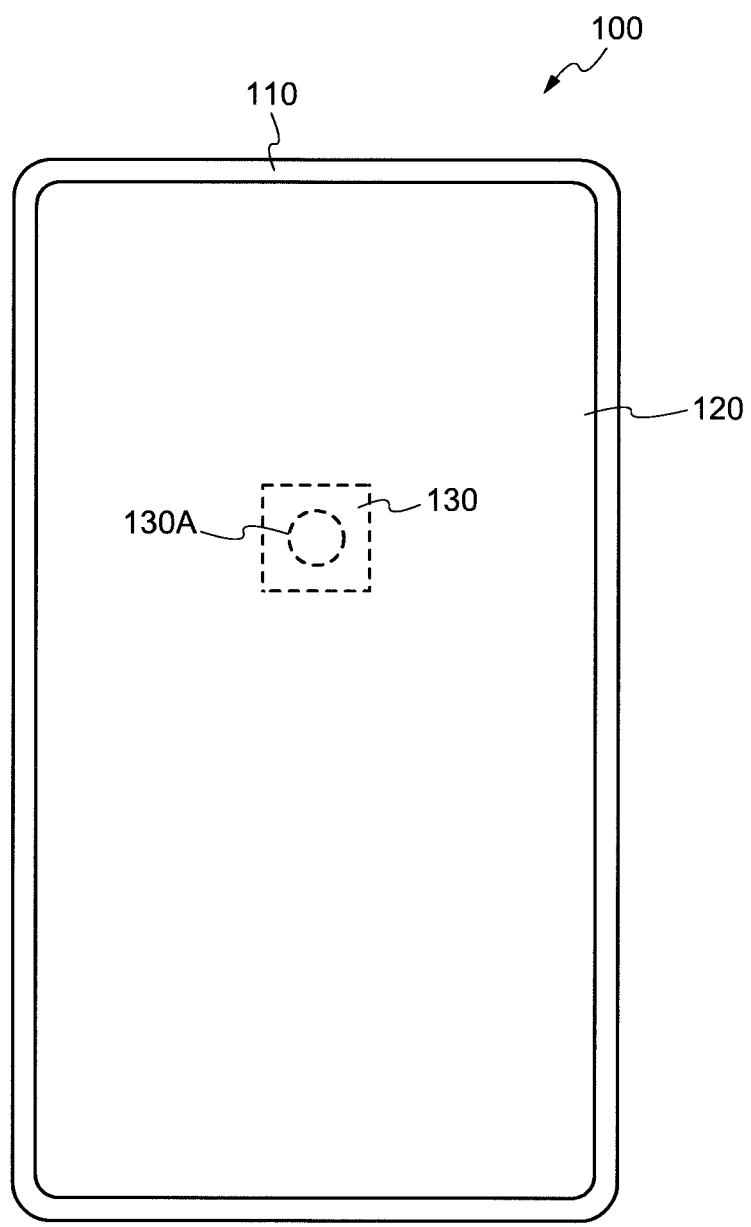
FIG. 1 is a plan view of an appearance of a display device according to a first embodiment.

Like the display device described in the prior art, in a configuration in which a camera unit is arranged on the backside of a liquid crystal panel, an image of an imaging target passes through the liquid crystal panel and incident on the camera unit. At this time, there was a problem that the light incident on the liquid crystal panel is diffracted by a plurality of pixels, and a captured image has deteriorated. Specifically, there is a problem that the incident light of each color of the RGB is diffracted in each sub-pixel corresponding to each RGB color, and ghosts (specifically, interference fringes) are generated around the image of the imaging target.

One of the problems of an embodiment of the present invention is to reduce the occurrence of ghosts in the captured image in the display device that captures images via a liquid crystal panel.

Embodiments of the present invention will be described below with reference to the drawings and the like. However, the present invention can be implemented in various modes without departing from the gist thereof, and should not be construed as being limited to the description of the following exemplary embodiments. For the sake of clarity of description, the drawings may be schematically represented with respect to widths, thicknesses, shapes, and the like of the respective portions compared with actual embodiments, but are merely an example and do not limit the interpretation of the present invention. In this specification and each drawing, elements having the same functions as those described with reference to the preceding drawings are denoted by the same reference numerals, and a repetitive description thereof may be omitted.

In this specification and claims, "surface side" refers to a side constituting the display screen in the display device, and "back surface side" refers to a side opposite the surface side. "above" and "below" in a cross-sectional view refer to a relative positional relation with reference to the imaging device. For example, in this specification, the direction from the imaging device to the liquid crystal panel is defined as "up" and the opposite direction is defined as "down". In this specification and claims, when expressing a mode of arranging another structure on a certain structure, it includes both the case of arranging another structure directly above a certain structure and the case of arranging another structure above a certain structure through another structure, unless otherwise specified.

First embodiment

A display device 100 according to a first embodiment will be described. In the present embodiment, a display device 100 is a portable terminal having a liquid crystal panel.

FIG. 1 is a plan view showing an appearance of a display device 100 according to a first embodiment. As shown in FIG. 1, the display device 100 of the present embodiment includes a housing 110, a display screen 120, and an imaging unit 130. The housing 110 houses a liquid crystal panel 200 and a group of circuits for driving the liquid crystal panel 200, which will be described later. The display screen 120 is an interface for displaying an image. The display screen 120 is the surface of the liquid crystal panel 200 housed in the housing 110. The surface of the liquid crystal panel 200 functions as the display screen 120 by being visually recognized through a cover glass or the like. The imaging unit 130 includes an imaging device 132, which will be described later, and a control unit (not shown) for imaging the incident light detected by the imaging device 132 as an image.

The imaging unit 130 is housed inside the housing 110 and is arranged on the back surface side of the liquid crystal panel 200. That is, when the viewpoint of the user is used as a reference, the imaging unit 130 is arranged on the back side of the display screen 120, and therefore cannot be visually recognized by the user. In this specification, among the liquid crystal panel 200 in a plan view, an area that overlaps the part of the imaging unit 130 where the imaging device 132 is arranged is referred to as an "imaging area 130A". In the display device 100 of the present embodiment, an image is displayed in the imaging area 130A in the same manner as in the other areas.

Figure 2:
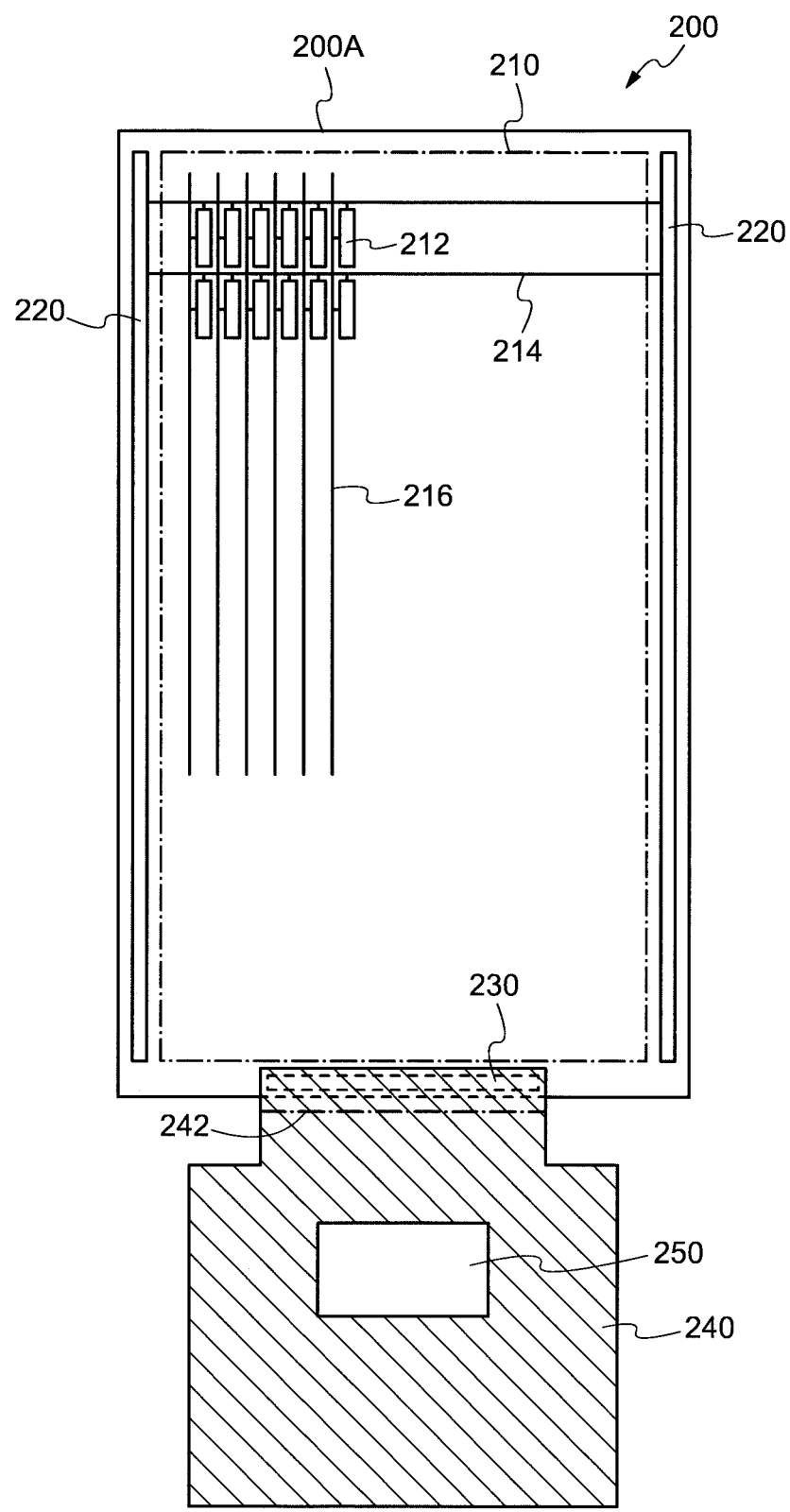
FIG. 2 is a plan view of a configuration of a liquid crystal panel according to the first embodiment.

FIG. 2 is a plan view showing a configuration of the liquid crystal panel 200 according to the first embodiment. However, for convenience of explanation, a circuit substrate 200A of the liquid crystal panel 200 is illustrated in FIG. 2, and a liquid crystal layer 200B and a counter substrate 200C, which will be described later, are not shown.

As shown in FIG. 2, a display circuit 210, a scan signal line drive circuit 220, and a terminal part 230 are provided on the surface side of the circuit substrate 200A of the liquid crystal panel 200. The circuit substrate 200A is a substrate in which a plurality of switching elements such as a thin film transistor is arranged on a support substrate having light transmittance. The circuit substrate 200A is sometimes referred to as an active matrix substrate. A glass substrate or a resin substrate having flexibility can be used as the support substrate constituting the circuit substrate 200A.

The display circuit 210 is a circuit for controlling a plurality of pixels 212 for displaying an image. Specifically, the display circuit 210 includes a plurality of scan signal lines 214 extending in the row direction and a plurality of video signal lines 216 extending in the column direction. The pixels 212 including the switching element such as the thin film transistor are provided at each of the intersections of the plurality of scan signal lines 214 and the plurality of video signal lines 216. In this embodiment, each pixel 212 is a sub-pixel corresponding to one of the colors of R (red), G (green), and B (blue). Therefore, in reality, color display is performed in a unit of one pixel (main pixel) including three pixels 212 corresponding to each color of the RGB. An area provided with the display circuit 210 approximately matches the area provided with the plurality of pixels 212. Therefore, in this specification, in the liquid crystal panel 200 in a plan view, the area provided with the display circuit 210 is sometimes referred to as the "display area". A schematic configuration of each pixel 212 will be described with reference to FIG. 3.

Figure 3:
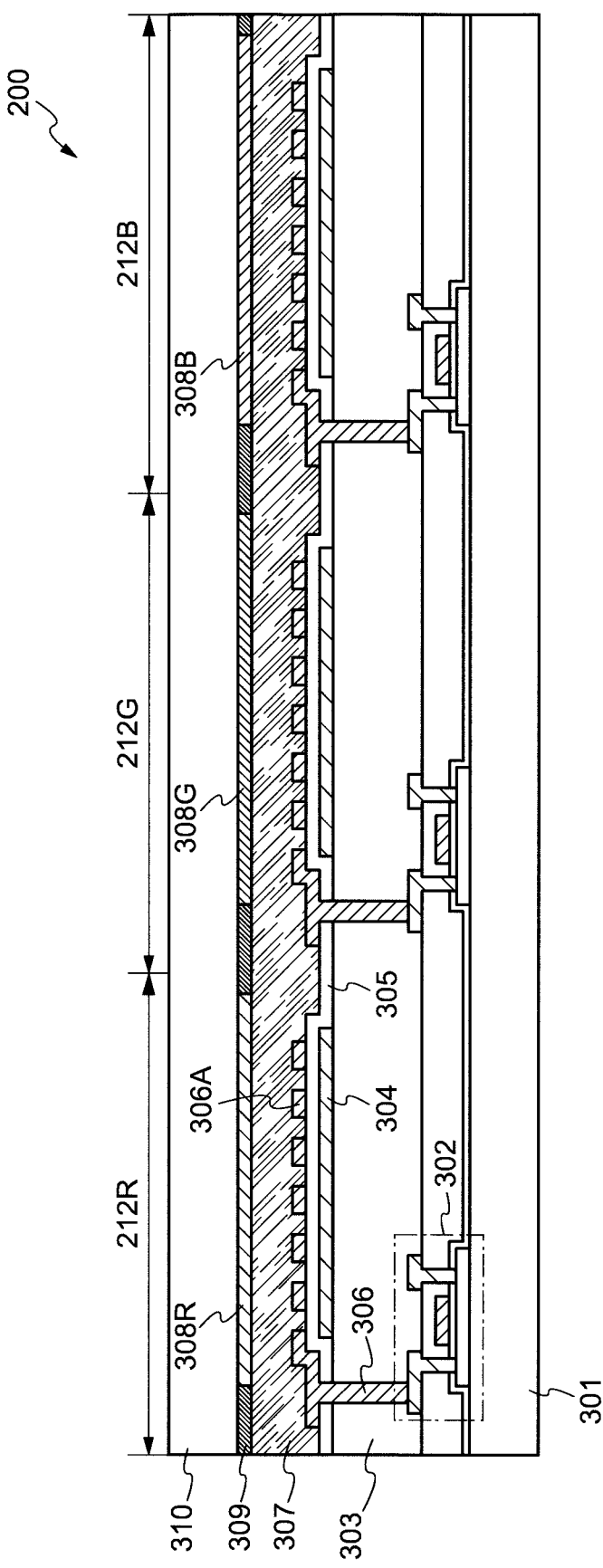
FIG. 3 is a cross-sectional view of a configuration of a pixel of the liquid crystal panel according to the first embodiment.

FIG. 3 is an cross-sectional view showing a configuration of the pixel 212 of the liquid crystal panel 200 according to the first embodiment. In FIG. 3, three pixels 212 corresponding to each RGB color are provided on a support substrate 301. Specifically, a pixel corresponding to red (hereinafter referred to as "R-pixel 212R"), a pixel corresponding to green (hereinafter referred to as "G-pixel 212G"), and a pixel corresponding to blue (hereinafter referred to as "B-pixel 212B") are provided on the support substrate 301. The R-pixel 212R will be described here, the G-pixel 212G and B-pixel 212B will be described focusing on the points different from the R-pixel 212R.

The R-pixel 212R includes a thin film transistor 302 as the switching element. A common electrode 304 is arranged on a planarizing film 303 that covers the thin film transistor 302. A pixel electrode 306 is arranged on the common electrode 304 via an insulating layer 305. The pixel electrode 306 is electrically connected to the thin film transistor 302 via an opening provided in the planarizing film 303 and the insulating layer 305.

In the present embodiment, a part of the pixel electrode 306 arranged on the common electrode 304 is processed into a comb-tooth shape. That is, although FIG. 3 shows a plurality of pixel electrodes 306 provided, in reality, the pixel electrode 306 in a plan view has a comb-like patterned shape. Specifically, the pixel electrode 306 in a plan view has a shape in which a plurality of linear electrodes 306A arranged adjacently is connected at each end portion.

When a voltage is applied between the common electrode 304 and the pixel electrode 306, an electric field in the transverse direction (referred to as a fringe electric field) is formed between the common electrode 304 and the pixel electrode 306. In this embodiment, the fringe electric field is used to control the orientation of liquid crystal molecules (not shown) contained in a liquid crystal layer 307. Such a method of controlling liquid crystal molecules is also referred to an FFS (Fringe Field Switching) method.

A color filter corresponding to red (hereinafter referred to as "R-filter 308R") is arranged on the pixel electrode 306 via the liquid crystal layer 307. The R-filter 308R is provided on a counter substrate 310. Similarly, a color filter corresponding to green (hereinafter referred to as "G-filter 308G") is arranged in the G-pixel 212G. A color filter corresponding to blue (hereinafter referred to as "B-filter 308B") is arranged in the B-pixel 212B. A light-shielding film 309 is provided between each of the R-filter 308R, the G-filter 308G, and the B-filter 308B.

As described above, the R-filter 308R, the G-filter 308G, and the B-filter 308B are provided in the R-pixel 212R, the G-pixel 212G and B-pixel 212B, respectively. Therefore, light from a backlight unit 260 arranged on the back surface side of the liquid crystal panel 200 (reference FIG. 4) is separated into light of each color of the RGB by the R-filter 308R, the G-filter 308G, and the B-filter 308B. On the contrary, in this embodiment, in the imaging area 130A, external light (also referred to as ambient light) incident on the liquid crystal panel 200 is separated into light of each color of the RGB by the R-filter 308R, the G-filter 308G, and the B-filter 308B. This point will be described later.

Returning to FIG. 2 and the explanation will be continued. The scan signal line drive circuit 220 is coupled to the scan signal line 214 and transmits a scan signal to the scan signal line 214. Specifically, the scan signal is applied to a gate of the thin film transistor (not shown) included in the pixel 212 and is used for switching control of the thin film transistor. In this embodiment, similar to the plurality of pixels 212, the scan signal line drive circuit 220 is also formed using the thin film transistor, it may be substituted by an IC chip or the like. In this embodiment, the circuit substrate 200A includes two scan signal line drive circuits 220, but only one of them may be used.

Although not shown, the terminal part 230 is an assembly of a plurality of terminals connected to the scan signal line drive circuit 220 and the plurality of video signal lines 216. The terminal part 230 is arranged outside the display circuit 210. Video signals and control signals supplied from the outside are supplied to the display circuit 210 or the scan signal line drive circuit 220 via the terminal part 230.

The liquid crystal panel 200 is connected to a flexible printed circuit board 240 via the terminal part 230. The flexible printed circuit substrate 240 is an interface substrate for connecting the circuit substrate 200A of the liquid crystal panel 200 to an external control circuit (not shown). In this embodiment, a display control circuit 250 is mounted on the flexible printed circuit board 240. The display control circuit 250 is a signal processing circuit for processing various control signals to be transmitted to the scan signal line drive circuit 220 and video signals to be transmitted to the video signal lines 216. In this embodiment, the display control circuit 250 is mounted on the flexible printed circuit board 240 in the form of an IC chip.

The flexible printed circuit substrate 240 can be folded because it is a circuit substrate in which wirings are printed on the top of a flexible substrate made of a resin material. In this embodiment, the flexible printed circuit board 240 can be bent at a dashed line 242 in FIG.2 so that the flexible printed circuit board 240 and the back surface side of the circuit substrate 200A (the side such as the display circuit 210 is not formed) overlap. This allows the liquid crystal panel 200 and the flexible printed circuit board 240 to be compactly housed within the housing 110.

Figure 4:
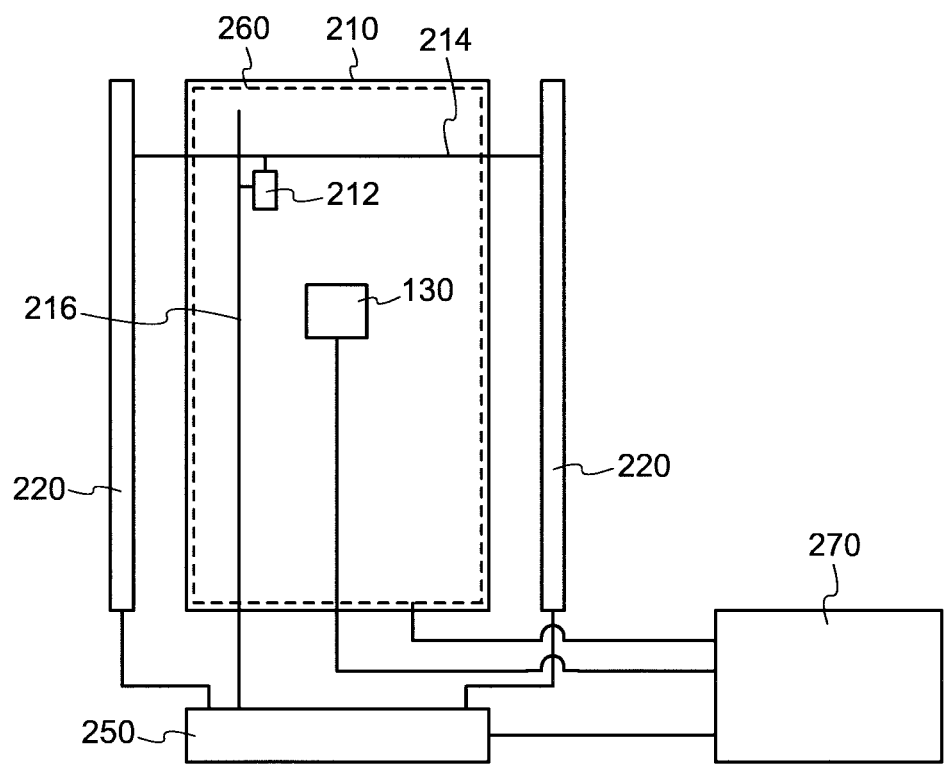
FIG. 4 shows an explanation of the circuit configuration in the first embodiment.

FIG. 4 is a diagram for explaining an outline of a circuit configuration according to the first embodiment. As described above, the various control signals transmitted to the scan signal line drive circuit 220 are processed by the display control circuit 250. The display control circuit 250 may generate a control signal, such as a start pulse, or the display control circuit 250 may perform a predetermined signal processing on the control signal acquired from an external system control circuit 270. The display control circuit 250 may also perform the predetermined signal processing on the video signals acquired from the system control circuit 270.

The system control circuit 270 collectively controls the display control circuit 250, the backlight unit 260, and the imaging unit 130. The backlight unit 260 includes a backlight and a backlight control circuit of the liquid crystal panel 200.

In this embodiment, the system control circuit 270 synchronizes the operation of the imaging unit 130, the operation of the display circuit 210, and the operation of the backlight unit 260. Thus, when the imaging unit 130 is not used, the image is displayed on the entire display screen 120, and when the imaging unit 130 is used, it is possible to control the display circuit 210 so that ghosts do not occur around the imaging target. A specific control method by the system control circuit 270 will be described later.

Figure 5:
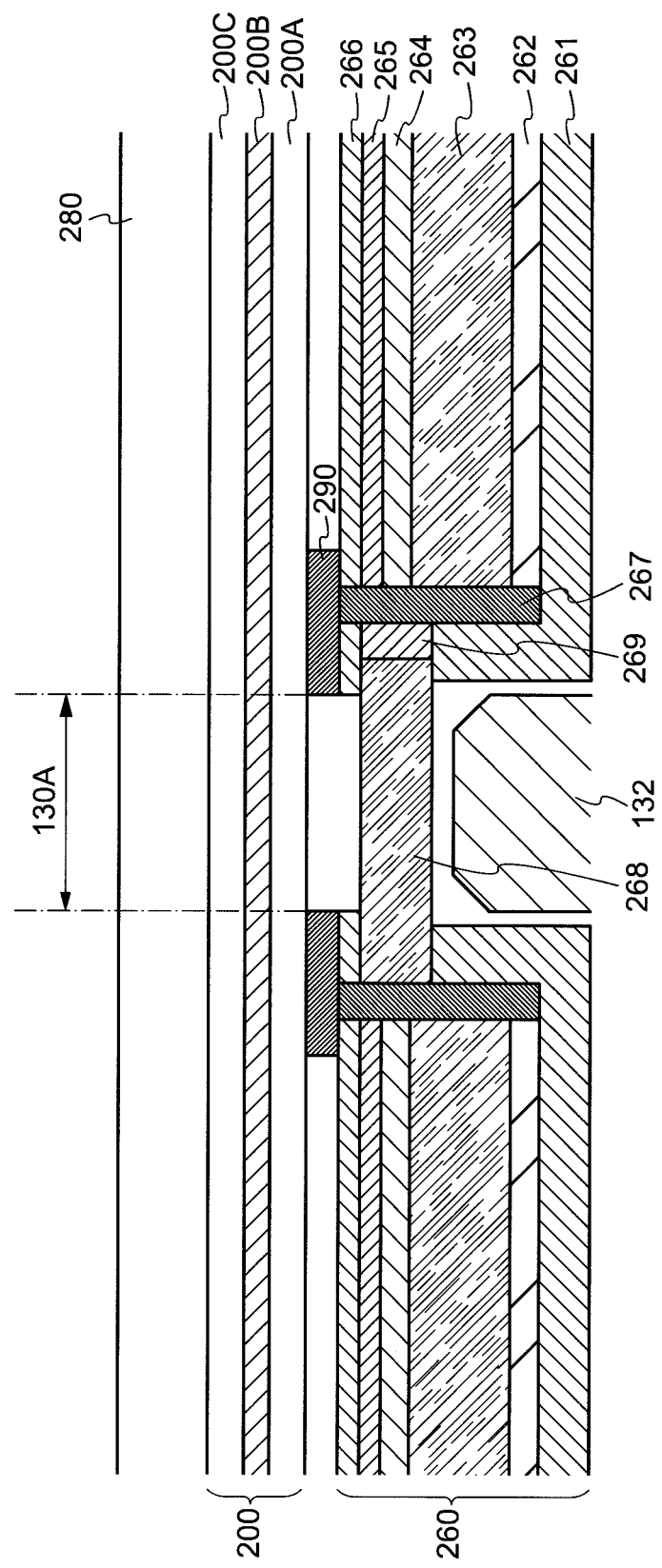
FIG. 5 is a cross-sectional view of a configuration near an imaging area of the liquid crystal panel according to the first embodiment.

FIG. 5 is a cross-sectional view showing a configuration near the imaging area 130A of the liquid crystal panel 200 according to the first embodiment. Specifically, FIG. 5 corresponds to a cross-sectional view in which the imaging area 130A shown in FIG. 1 is cut. The liquid crystal panel 200 includes the circuits substrate 200A, the liquid crystal layer 200B, and the counter substrate 200C. A cover glass 280 is provided on the liquid crystal panel 200. Although not shown, an optical film such as a polarizer is arranged on the top and bottom surfaces of the liquid crystal panel 200.

The back light unit 260 is arranged on the bottom surface of the liquid crystal panel 200 using an adhesive film 290 having a light-shielding property. As shown in FIG. 5, the adhesive film 290 has an opening at a position corresponding to the imaging area 130A. Therefore, the adhesive film 290 does not interfere with the imaging process by the imaging unit 130.

The backlight unit 260 includes a mold member 261, a reflection sheet 262, a first light-guide plate 263, a diffusion sheet 264, a first prism sheet 265, a second prism sheet 266, a light-shielding wall 267, a second light-guide plate 268, and a light source 269. However, the components described here is merely examples, the configuration of the backlight unit 260 is not limited to the configuration of FIG. 5.

The backlight unit 260 of this embodiment has the first light-guide plate 263 provided over substantially the entire area of the display circuit 210 (i.e., substantially the entire area of the display area), and the second light-guide plate 268 provided locally corresponding to the imaging area 130A. A light source (not shown) is provided on the side surface of the first light-guide plate 263. The light source 269 is provided on the side surface of the second light-guide plate 268. The light source arranged on the side surface of the first light-guide plate 163 and the light source 269 arranged on the side surface of the second light-guide plate 268 are both LED light sources and can be controlled independently of each other.

As shown in FIG. 5, the light-shielding wall 267 is arranged between the first light-guide plate 263 and the second light-guide plate 268. Therefore, the light transmitted inside the first light-guide plate 263 does not affect the imaging area 130A. Therefore, the display device 100 can locally darken only the imaging area 130A. For example, when displaying a normal image, light is incident on both the first light-guide plate 263 and the second light-guide plate 268 to display the image over the entire area of the display screen 120. On the other hand, when imaging using the imaging device 132, light is incident only on the first light-guide plate 263 with the light source 269 is turned off, and it is possible to image in a state by locally darken only the imaging area 130A of the display screen 120.

When imaging, the imaging area 130A can be darkened by turning off the light source 269 in synchronization with the operation of the imaging device 132. In addition, the pixels located inside the imaging area 130A are transitioned to the transmission state (light-transmitting state) according to the timing of darkening the imaging area 130A. That is, it is assumed that the light from the subject located in front of the display screen 120 is incident on the imaging device 132. At this time, each pixel 212 corresponding to each color of the RGB includes a color filter (not shown) corresponding to each color of the RGB. Therefore, when visible light incident from the front of the display screen 120 passes through the plurality of pixels 212, it is separated into each color of the RGB and incident on the imaging device 132. This state will be described with reference to FIG. 6.

Figure 6:
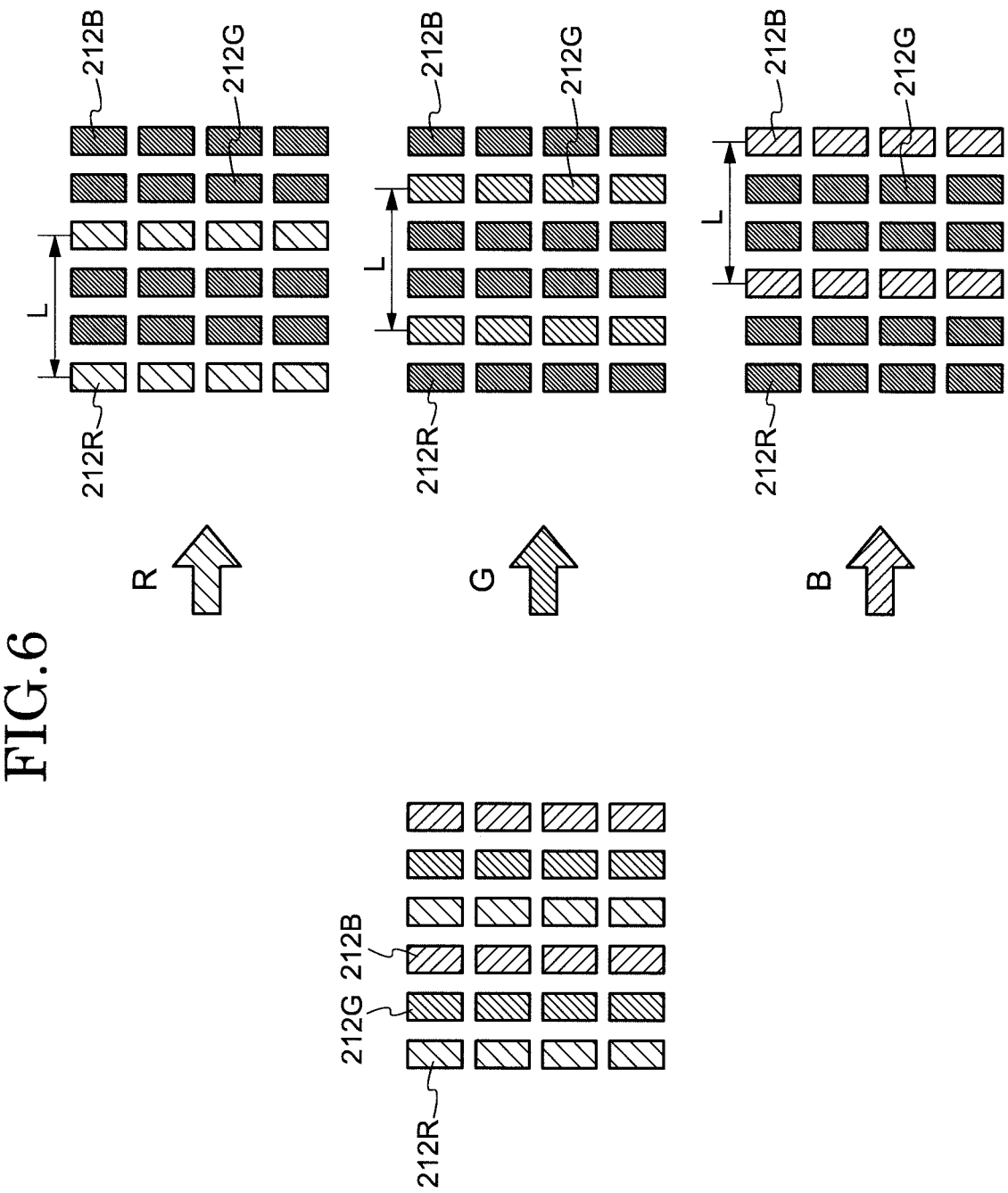
FIG. 6 is a plan view of a distribution of light passing through each pixel in a case where all pixels in the imaging area are set to transmission as a comparative example.

FIG. 6 is a plan view showing a distribution of light passing through each pixel in the case where all the pixels 212 in the imaging area 130A are set to transmission as a comparative example. As shown in the left side of FIG. 6, the R-pixel 212R, the G-pixel 212G, and the B-pixel 212B are arranged in a matrix in the imaging area 130A. Pixel arrays shown in FIG. 6 are stripe arrays in which pixels of the same color are continuously arranged in the column direction. Pixels of the same color are hatched in the same manner.

Here it is assumed that the visible light is incident on the imaging area 130A from the front of the display screen 120. Since the R-filter 308R (see FIG. 3) that transmits red light (hereinafter referred to as "R-light") is arranged in the R-pixel 212R, the R-pixel 212R transmits red light. Similarly, the G-pixel 212G transmits green light (hereinafter referred to as "G-light"), and the B-pixel 212B transmits blue light (hereinafter referred to as "B-light"). Therefore, the visible light incident on the imaging area 130A is, as shown in the right side of FIG. 6, transmitted as the R-light, the G-light, and the B-light every two pixels. That is, in the imaging device 132, it is recognized as a column of light of each color of the RGB incident with a regular interval L. The term "interval" here refers to an interval between the pixels through which the light of the color is transmitted (interval between the center lines of the pixels) when attention is paid to the light of a certain color. In this specification, this interval may be referred to as a "transmission pitch".

Strictly speaking, for example, the R-light may also pass through other pixels than the R-pixel 212R. However, since the amount of light of the R-light passing through the other pixels other than the R-pixel 212R is considered very slight, substantially, the R-light will be described as not passing through other than the R-pixel 212R. The same applies to the G-light and the B-light other than the R-light.

At this time, for example, the visible light transmits the R-pixel 212R arranged in stripes at the transmission pitch L is substantially equivalent to the R-light transmits the slits regularly arranged at the interval L. Therefore, when the visible light transmits the R-pixel 212R, diffraction of the R-light occurs, and the R-light passed through each R-pixel 212R interferes with each other. The same phenomenon occurs in the G-light and the B-light. As a result, the light of each color of RGB interferes with each other and causes ghosts around the imaging target (subject).

Therefore, in this embodiment, diffraction of light is suppressed by intentionally expanding the above transmission pitch, and as a result, the occurrence of ghosts is reduced. In addition, in this embodiment, the distribution of the light of each RGB color passing through the imaging area 130A is made discrete, thereby reducing the occurrence of ghosts.

Figure 7:
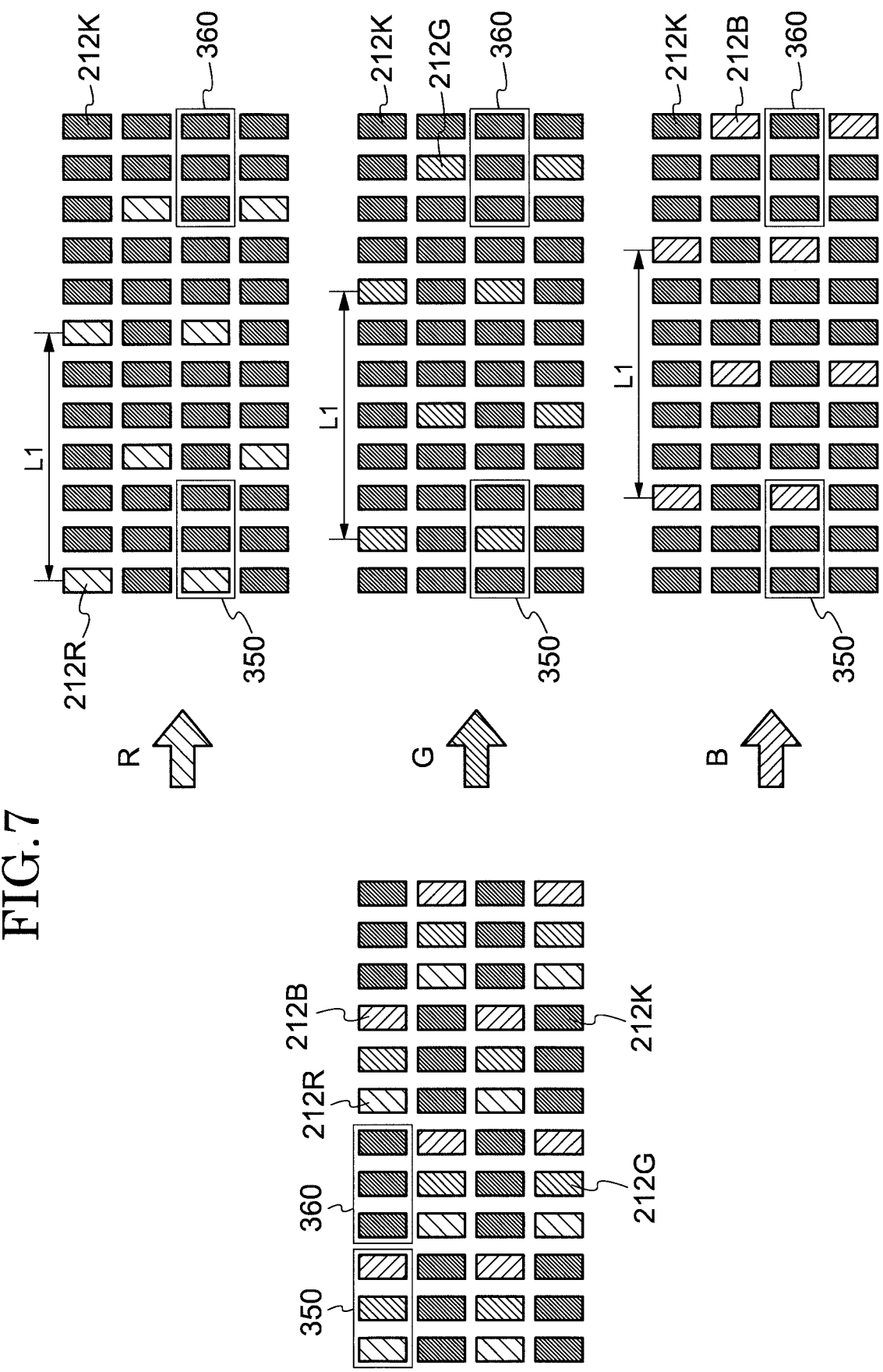
FIG. 7 is a plan view to explain how to control the pixels in the imaging area according to the first embodiment.

FIG. 7 is a plan view to explain how to control the pixel 212 in the imaging area 130A according to the first embodiment. As shown in the left side of FIG. 7, in this embodiment, the pixels arranged in the imaging area 130A area controlled to display a specific pattern according to the operation of the imaging unit 130. Specifically, the system control circuit 270 controls the display circuit 210 so that a white display pixel 350 and a black display pixel 360 are alternately arranged in the row direction and the column direction in the imaging area 130A. The white display pixel 350 and the black display pixel 360 are main pixels including a plurality of sub-pixels. In this specification, the main pixel controlled to be displayed in white, for example, the main pixel controlled to transmit all included sub-pixels, is referred to as the "white display pixel 350". The main pixel controlled to be displayed in black, for example, the main pixel controlled to light-shield all included sub-pixels, is referred to as the "black display pixel 360". In FIG. 7, a turned-off pixel constituting the black display pixel 360 is referred to as a "black pixel 212K". Pixels of the same color are hatched in the same manner.

In the case of the configuration shown in FIG. 7, the visible light incident on the imaging area 130A is, as shown in the right side of FIG. 7, passing through as the R-light, the G-light, and the B-light every five pixels. For example, in the case of the R-pixel 212R, three black pixels 212K are arranged in addition to the G-pixel 212G and the B-pixel 212B which can be regarded as substantially black pixels. Therefore, the transmission pitch L1 between the adjacent R-pixels 212R shown in FIG. 7 is longer than the transmission pitch L between the adjacent R-pixels 212R shown in FIG. 6. As a result, the display device 100 of this embodiment can suppress the diffraction of the R-light. Similarly, the diffraction can be suppressed for the G-light and the B-light. Therefore, according to this embodiment, it is possible to reduce the occurrence of ghosts around the imaging target.

Furthermore, in this embodiment, since the white display pixel 350 and the black display pixel 360 are alternately arranged not only in the row direction but also in the column direction, as shown in the right side of FIG. 7, the light of each RGB color is discretely incident on the imaging device 132. With such a configuration, the continuity of the distribution of light transmitted through the imaging area 130A is disturbed, and the diffraction of light is suppressed.

In this embodiment, the white display pixel 350 and the black display pixel 360 are alternately arranged, but the present invention is not limited thereto. For example, two or more black display pixels 360 may be arranged between the adjacent white display pixels 350 to further increase the transmission pitch L1. The length of the transmission pitch L1 may vary depending on the wavelength of the transmitted through light, but it is preferably 50pm or more (preferably 100pm or more). When the number of the black display pixel 360 is increased, the effect of suppressing the diffraction of light is increased, the amount of light passing through the imaging area 130A is reduced. However, when the amount of external light is large, even if the amount of light passing through the imaging area 130A decreases, there is not much trouble in imaging. Therefore, the amount of external light may be detected by a illuminance sensor or the like (not shown) and controlled to determine the number of the black display pixel 360 arranged between the white display pixels 350 in accordance with the detected value of illuminance sensor or the like.

Second Embodiment

In this embodiment, an example in which a configuration of the pixel 212 in the imaging area 130A at the time of an operation of the imaging unit 130 is different from that of the first embodiment will be described. Specifically, in this embodiment, an example in which a regularity of a transmission pitch of each RGB color transmitted through the imaging area 130A is intentionally disturbed by mixing the sub-pixel that lights in white among the pixels of each RGB color is shown. This embodiment will be described focusing on points different from the first embodiment. Therefore, the same configuration as the first embodiment may be omitted by indicating the same reference numerals.

Figure 8:
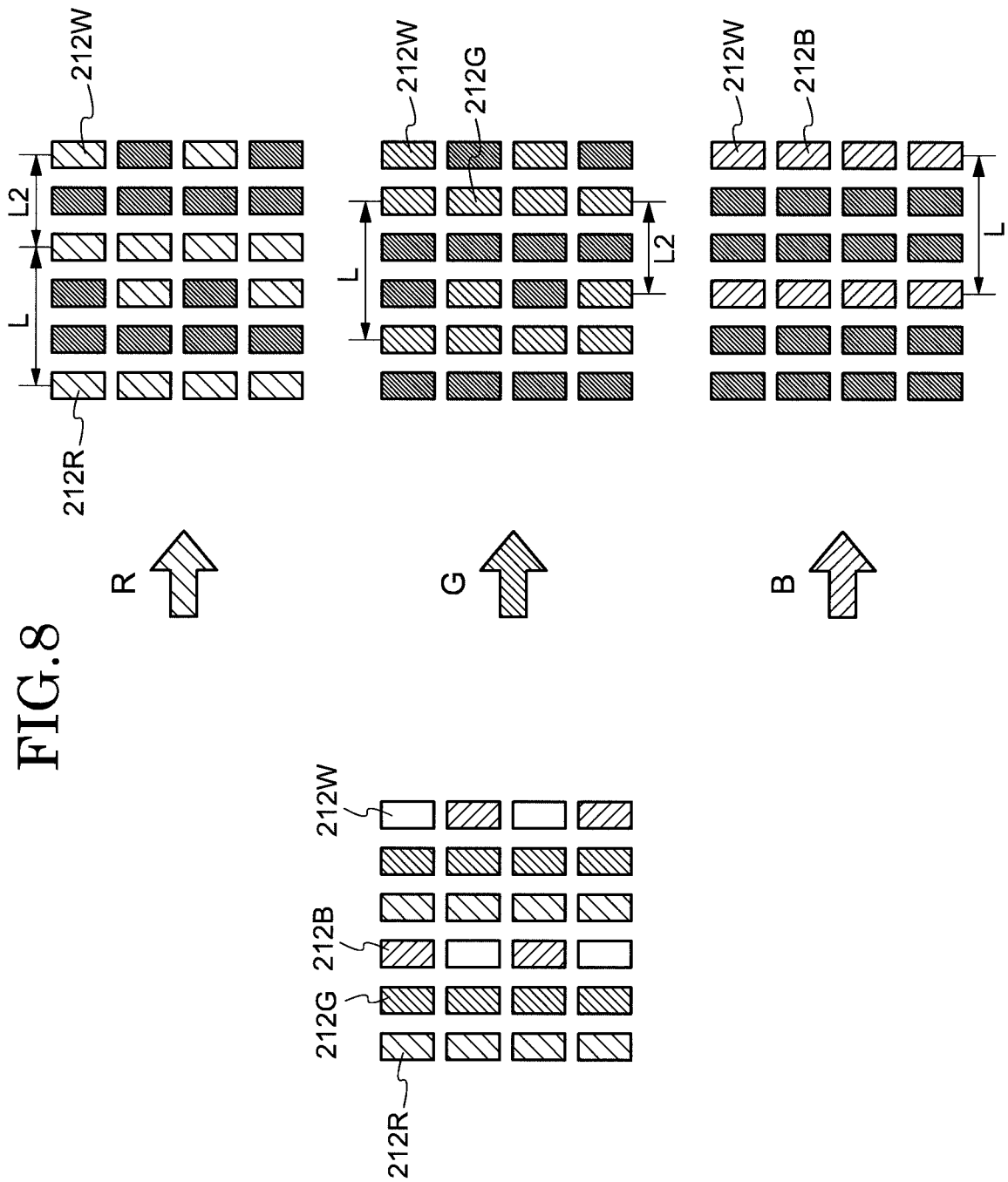
FIG. 8 is a plan view of a configuration of a pixel in an imaging area according to a second embodiment.

FIG. 8 is a plan view showing a configuration of the pixel 212 in the imaging area 130A according to a second embodiment. As shown in the left side of FIG. 8, in this embodiment, a part of the B-pixels 212B is replaced with a sub-pixel that light in white (hereinafter referred to as a "white pixel 212W"). Specifically, the B-pixel 212B and the white pixel 212W are alternately arranged in the column direction. In this embodiment, the white pixel 212W does not include a color filter. That is, the white pixel 212W passes through the light incident from the backlight unit 260 as it is. On the contrary, the external light incident on the liquid crystal panel 200 is also passed through as it is.

In such a configuration, the external light incident on the imaging area 130A passes through the white pixel 212W as it is, and is detected by the imaging device 132. Therefore, for example, when attention is paid to the R-light among the visible light, the R-light (actually, the R-light component in the visible light) is detected at the position where the white pixel 212W is arranged in addition to the position (coordinate) where the R-pixel 212R is arranged, as shown in the right side of FIG. 8. Therefore, the transmission pitch of the R-light is a mixture of a L and L2. In other words, the transmission pitch can be intentionally disturbed by mixing the white pixels 212W to the R-pixel 212R, the G-pixel 212G, and the B-pixel 212B in the imaging area 130A. As a result, the diffraction of light is suppressed, and the occurrence of ghosts is reduced.

In this embodiment, since a part of the B-pixels 212B is replaced with the white pixels 212W, the transmission pitch of only the B-light does not vary. However, the visibility of the B-light is inferior to the visibility of the R-light and the G-light, ghosts by the diffraction of the B-light is difficult to be visually recognized, and it can be said that it is a level without practical problems.

In this embodiment, a part of the B-pixels 212B is replaced with the white pixels 212W, but a part of the R-pixels 212R or the G-pixels 212G may be replaced with the white pixels 212W. A part of the pixels of the two colors may be replaced with the white pixels 212W, for example, a part of the R-pixels 212R and a part of the B-pixels 212B may be replaced with the white pixels 212W.

Third Embodiment

In this embodiment, an example in which a configuration of the pixels in the imaging area 130A at the time of an operation of the imaging unit 130 is different from that of the first embodiment will be described. Specifically, in this embodiment, an example in which a design pattern of the pixel electrode 306 is different for pixels of the same color adjacent to each other in the row direction is shown. This embodiment will be described focusing on points different from the first embodiment. Therefore, the same configuration as the first embodiment may be omitted by indicating the same reference numerals.

Figure 9:
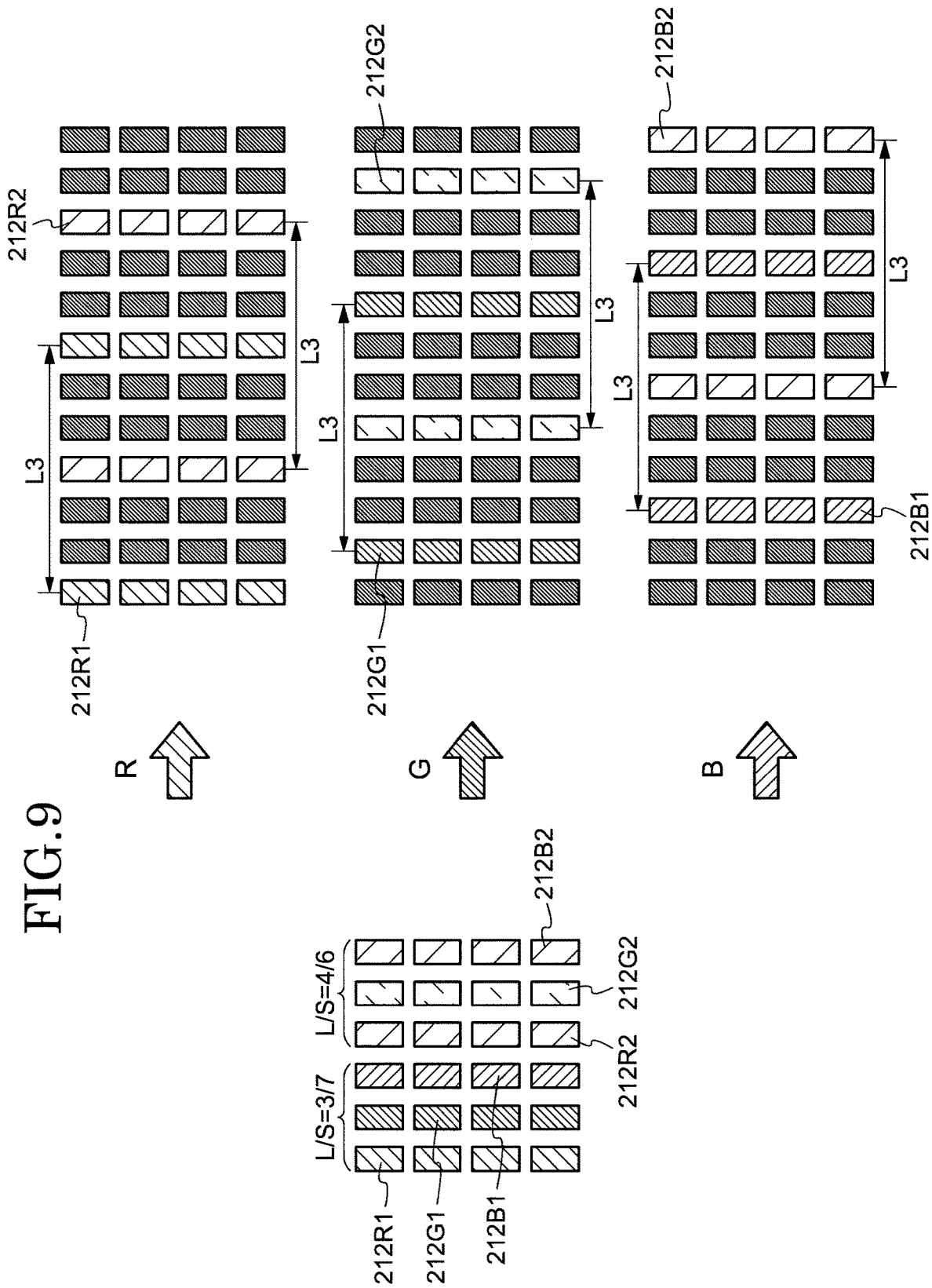
FIG. 9 is a plan view of a configuration of a pixel in an imaging area according to a third embodiment.

FIG. 9 is a plan view showing a configuration of the pixel 212 in the imaging area 130A according to a third embodiment. As shown in the left side of FIG. 9, in this embodiment, L/S (line-and-space) of the linear electrode 306A constituting the pixel electrode 306 is different between the adjacent pixels of the same color. "Line-and-space" means the ratio between the width of a wiring and the width (distance) between the wirings when a plurality of wirings is aligned in parallel. For example, in the drawing in the left side of FIG. 9, an R-pixel 212R1 is L/S=3/7, an R-pixel 212R2 adjacent to the R-pixel 212R1 is L/S=4/6. This point will be described with reference to a specific example.

Figure 10A:
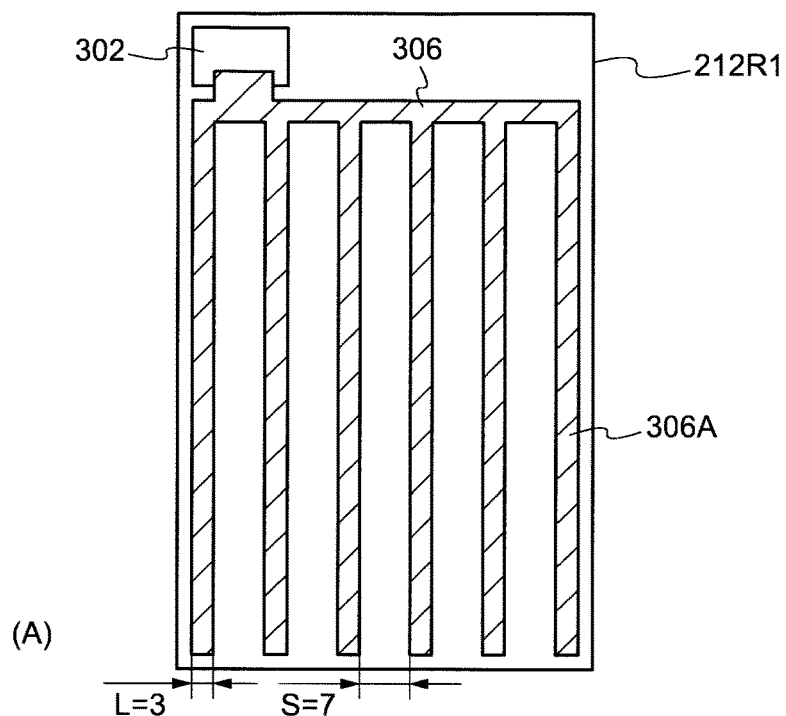
FIG. 10A is a plan view of a configuration of a pixel electrode according to the third embodiment.
Figure 10B:
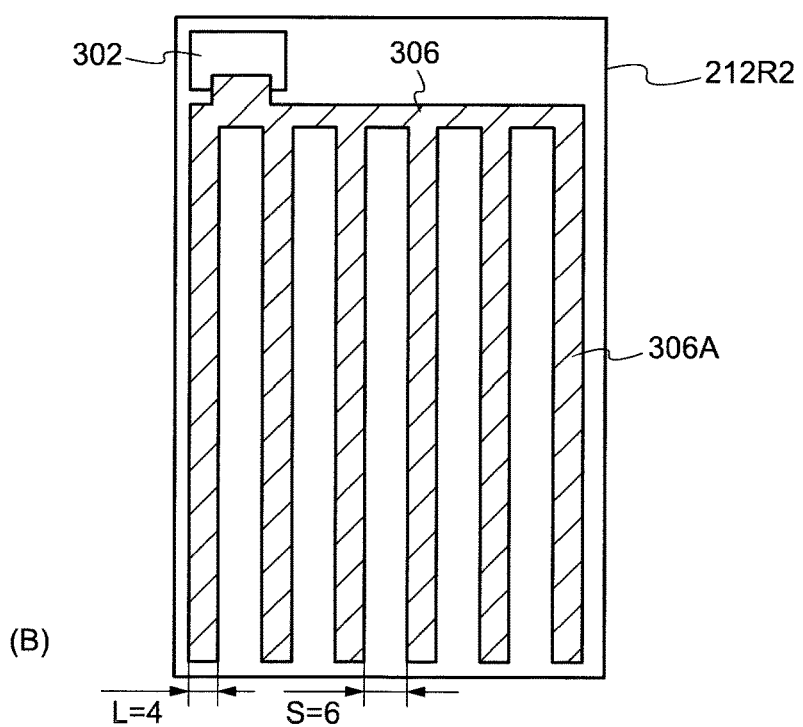
FIG. 10B is a plan view of a configuration of a pixel electrode according to the third embodiment.

FIG. 10A and FIG. 10B are plan views showing a configuration of the pixel electrode 306 according to the third embodiment. Specifically, FIG. 10A shows a configuration of the pixel electrode 306 of a R-pixel 212R1 shown in FIG. 9. FIG. 10B shows a configuration of the pixel electrode 306 of a R-pixel 212R2 shown in FIG. 9. Here will be described the R-pixel 212R, the same applies to the G-pixel 212G and the B-pixel 212B.

As shown in FIG. 10A, in the R-pixel 212R1, the pixel electrode 306 is electrically connected to the thin film transistor 302. The pixel electrode 306 has a comb-like patterned shape. Specifically, the pixel electrode 306 in a plan view has a shape in which the plurality of linear electrodes 306A arranged adjacently is connected at each end portion. In this embodiment, a line width (L) of the linear electrode 306A of the R-pixel 212R1 is 3 µm, and an interval (S) of the adjacent linear electrodes 306A is 7 µm.

On the other hand, as shown in FIG. 10B, a line width (L) of the linear electrode 306A of the R-pixel 212R2 is 4 µm, and an interval (S) of the adjacent linear electrodes 306A is 6 µm. Thus, in this embodiment, the ratio between the width of the linear electrode 306A and the width between the adjacent linear electrodes 306A constituting pixel electrode 306 is different between the R-pixel 212R1 and the adjacent R-pixel 212R2.

Thus, by making the L/S (line and space) of linear electrode 306A constituting pixel electrode 306 (i.e., the design pattern of pixel electrode 306) different between the adjacent pixels of the same color, it is possible to make a diffraction condition when the light passes through the pixels different. By making the diffraction condition between the adjacent pixels of the same color different, it is possible to suppress the interference of light between those pixels. That is, substantially the same effect as in the case where the transmission pitch is lengthened can be obtained.

For example, in the diagram shown in the right side of FIG. 9, although the pixels of the same color adjacent to the R-pixel 212R1 is the R-pixel 212R2, since the diffraction condition is different, the interference of the transmitted through the R-pixel 212R1 and the R-pixel 212R2 can be substantially ignored. Therefore, the transmission pitch with respect to the R-light can be regarded as an interval L3 between the R-pixel 212R1 and the adjacent R-pixel 212R1, for example. Thus, by making the diffraction condition between the adjacent pixels of the same color different, it is possible to substantially increase the transmission pitch.

In this embodiment, an example in which the design pattern of the pixel electrode 306 is different for the pixels of the same color adjacent to a row direction is shown, but the design pattern of the pixel electrode 306 may be different for the pixels of the same color adjacent to a column direction as well. That is, the design pattern of the pixel electrode 306 may be different for the pixels of the same color adjacent to the row direction and the column direction. In this embodiment, an example of using two types of design patterns is shown, but three or more types of design patterns may be used.

Fourth Embodiment

In this embodiment, an example in which a configuration of the pixels of the imaging area 130A at the time of an operation of the imaging unit 130 is different from that of the first embodiment will be described. Specifically, in this embodiment, an example in which an interval between the linear electrodes 306A of the pixel electrode 306 is different between the pixel in the imaging area 130A and the pixel in the area other than the imaging area 130A is shown. This embodiment will be described focusing on points different from the first embodiment. Therefore, the same configuration as the first embodiment may be omitted by indicating the same reference numerals.

Figure 11A:
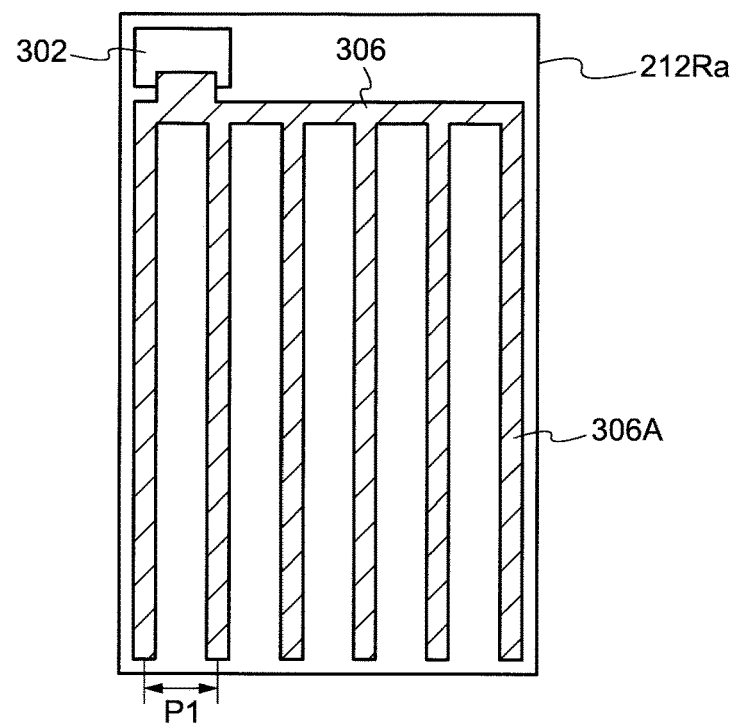
FIG. 11A is a plan view of a configuration of a pixel in an imaging area according to a fourth embodiment.
Figure 11B:
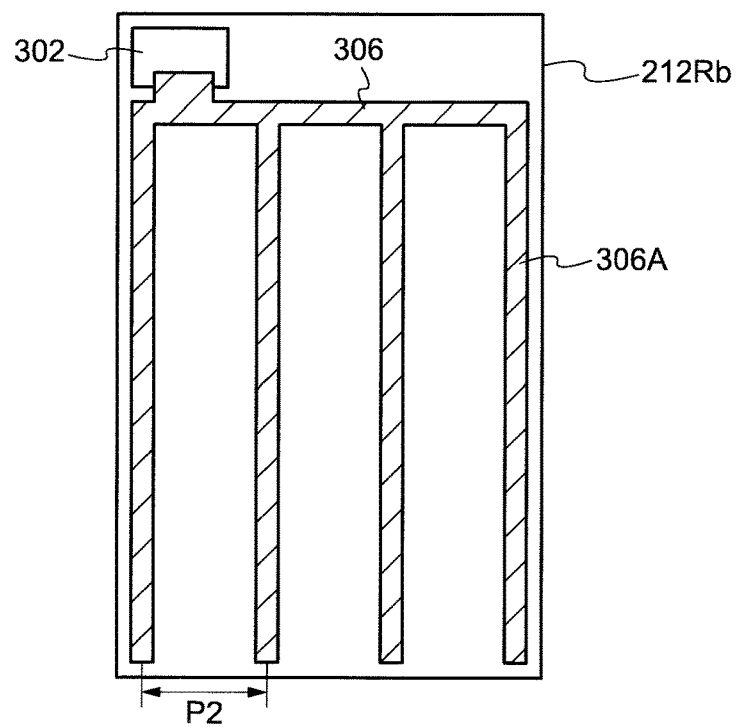
FIG. 11B is a plan view of a configuration of a pixel in an imaging area according to the fourth embodiment.

FIG. 11A and FIG. 11B are plan views showing a configuration of the pixel electrode 306 according to a fourth embodiment. Specifically, FIG. 11A shows a configuration of the pixel electrode 306 of a R-pixel 212Ra in the area other than the imaging area 130A (i.e., substantially the entire area of the display screen 120). FIG. 11B shows a configuration of the pixel electrode 306 of a R-pixel 212Rb in the imaging area 130A.

As shown in FIG. 11A and FIG. 11 B, an interval P of the linear electrodes 306A is different between the imaging area 130A and the area other than the imaging area 130A. Specifically, as shown in FIG. 11B, an interval P2 of the linear electrodes 306A in the R-pixel 212Rb arranged in the imaging area 130A is wider than an interval P1 of the linear electrodes 306A in the R-pixel 212Ra arranged in the area other than the imaging area 130A shown in FIG. 11A. The term "interval" as used here refers to the interval between the adjacent linear electrodes (i.e., interval between the center lines of the linear electrodes). In this specification, this interval is sometimes referred to as an "electrode pitch".

In the findings of the present inventors, the diffraction of light tends to be stronger as the electrode pitch is dense. Therefore, in this embodiment, by intentionally widening the electrode pitch of the pixels arranged in the imaging area 130A, the diffraction of light passing through the pixel is suppressed. To widen the pitch, the interval between the linear electrode 306A may be increased or the number of the linear electrode 306A may be reduced, as compared with the pixels in the area other than the imaging area 130A.

Although it is possible to suppress the diffraction of light as the electrode pitch is widened, since the diffraction condition of light is different according to the wavelength, it is desirable to set the optimum condition individually for the light of each color of the RGB. In particular, since the shorter the wavelength of B-light, the stronger the diffraction, it is desirable to set the electrode pitch of the B-pixel 212B to be larger than that of the R-pixel 212R and the G-pixel 212G.

On the other hand, when the electrode pitch of the linear electrode 306A is widened in the pixel, the number of the linear electrodes 306A arranged in the pixel is reduced. As the number of the linear electrode 306A decreases, the transmittance of the pixel decreases. Therefore, when this embodiment is applied, there is a case where the transmittance of the pixels arranged in the imaging area 130A is reduced. In particular, generally, since the transmittance of the color filter that transmits the B-light (B-filter 308B in FIG. 3) is low, the B-pixel 212B is likely to be darkened. Therefore, in this embodiment, pixel sizes (areas) of the R-pixel 212R, the G-pixel 212G, and the B-pixel 212B (area) are made to be different from each other.

FIG. 12 is a plan view showing a configuration of the pixel 212 in the imaging area 130A according to the fourth embodiment. As shown in the left side of FIG. 12, in this embodiment, pixel sizes of the R-pixel 212R, the G-pixel 212G, and the B-pixel 212B are different from each other. Specifically, a pixel size of the R-pixel 212R is the smallest, followed by the G-pixel 212G, and the B-pixel 212B in this order. As described above, in this embodiment, the number of the linear electrode 306A is reduced (the electrode pitch is widened), when the transmittance is decreased, the pixel size is increased to compensate for the decrease. Therefore, in this embodiment, the size of the B-pixel 212B which is most susceptible to the reduction of the transmittance is set to the largest.

Although this embodiment has been described on the assumption that the transmittance of the B-filter 308B is the lowest, if each transmittance of the R-filter 308R, the G-filter 308G, and B-filter 308B is about the same, it can be said that there is no issue even if the pixel size is not different. That is, in this embodiment, it is not an essential configuration to make the pixel size different for each color of the RGB.

In this embodiment, the pixel size of the R-pixel 212R is smallest, followed by the G-pixel 212G, and the B-pixel 212B in this order, but the present invention is not limited thereto. As for the magnitude relation of the pixel size, the decrease in the transmittance in each pixel varies depending on how the electrode pitch is set. Therefore, the magnitude relation of the pixel size of each pixel may be determined based on the decrease in the transmittance of each pixel due to the widening of the electrode pitch of the pixels corresponding to each color of the RGB.

Each of the embodiments described above as an embodiment of the present invention can be appropriately combined and implemented as long as they do not contradict each other. It is also included in the scope of the present invention that the skilled in the art adds, deletes, or changes the design of components, or adds, omits, or changes conditions of steps as appropriate based on the display device of the respective embodiments, as long as the gist of the present invention is provided.

Even if it is other working effects which is different from the working effect brought about by the mode of each What is clamed is:

1. A display device comprising:
a liquid crystal display panel having pixels; and
an imaging device arranged on a back side of the liquid crystal display panel, wherein in an imaging area of the liquid crystal display panel overlapping the imaging device, the pixels are controlled so that black display pixels and white display pixels are alternately lined up in a row direction according to an operation of the imaging device.

2. The display device according to claim 1, wherein the pixels are also controlled so that black display pixels and white display pixels are alternately lined up in a column direction.

3. A display device comprising:
a liquid crystal display panel having pixels; and
an imaging device arranged on a back side of the liquid crystal display panel, wherein a main pixel of the liquid crystal display panel includes sub-pixels corresponding to different colors from each other,
the liquid crystal display panel includes an imaging area overlapping the imaging device and an area other than the imaging area, and
a space between line electrodes of a pixel electrode in each of the sub-pixels located in the imaging area is wider than a space between line electrodes of a pixel electrode in each of the sub- pixels located in the area other than the imaging area, wherein
a pixel size of a sub-pixel corresponding to blue color is the largest among the sub-pixels.

4. The display device according to claim 3, wherein at least two of the sub-pixels have different pixel sizes from each other.

* * * * *